Feb. 26, 1929.
J. T. TRAVERS
1,703,373
METHOD OF TREATING POLLUTED WASTE WATER
Filed March 25, 1927
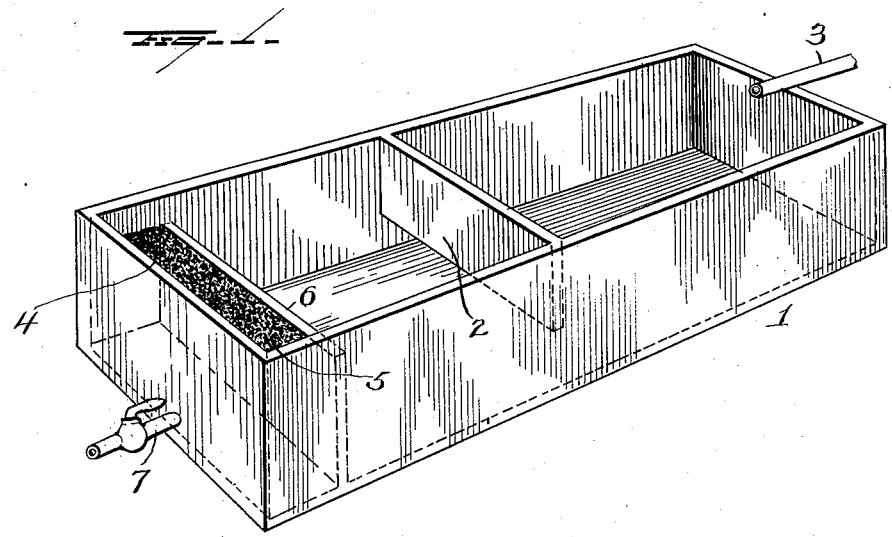
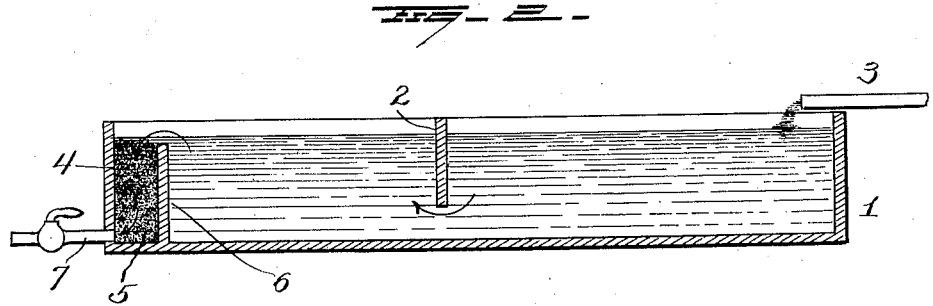

Patented Feb. 26, 1929.

1,703,373

UNITED STATES PATENT OFFICE.

JOHN T. TRAVERS, OF COLUMBUS, OHIO, ASSIGNOR, BY DIRECT AND MESNE ASSIGNMENTS, TO THE TRAVERS-LEWIS PROCESS CORPORATION, OF COLUMBUS, OHIO.

METHOD OF TREATING POLLUTED WASTE WATER.

Application filed March 25, 1927. Serial No. 178,415.

This invention relates to an improved method of treating polluted waters, such as tannery and strawboard waste having a strong alkaline reaction of a liquid character, wherein flocculent conditions obtain—the object of the invention being to clarify and repurify such waste or liquids by removing or separating the polluting matter therefrom, in order that the liquid or water so treated may be harmlessly discharged into a natural stream or other body of water without involving injurious consequences of any nature to animal or plant life existing in or using such streams.

In accordance with the present invention I take such tannery waste and strawboard waste having a strong alkaline reaction and which is in a liquid form and apply thereto a treating mixture consisting of sulphuric acid having a specific gravity 1.84 with 9 parts of clay or other inert material free from organic matter. I employ this mixture which consists of one part acid with 9 parts of clay in a dilution of one part treating mixture to 100 parts of water, this mixture to be applied, in proportion, to one part of the solution to 100 parts of the polluting liquid to be treated. The amount necessary to employ depends upon the calcium hydrate contained in the waste. Some waste liquid of this character contains more free lime than others.

The addition of the treating mixture above described to the polluting liquids issuing from tanneries and strawboard plants, having a strong alkaline reaction caused by an excess of lime, has the effect of causing coagulation of the organic matter held in partial solution in the liquid or in other words the application of the treating mixture or mixture causes the particles to assume a flaky physical condition, so that the specific gravity of the combined impurities or solids will be increased to an extent to be rapidly precipitated in well defined form to the bottom of the receptacles in which the liquids are contained. By so treating the liquids the clarified and purified part thereof may be drawn off from the precipitated solids and discharged in any desired manner into a stream, river or other body of water, and the latter will not in any way be contaminated thus discharged therein.

My treating mixture when employed in treating these wastes acts upon the calcium hydrate contained in liquor, causes coagulation of the organic solids including the coloring matter, this action being assisted by the clay contained in the treating mixture there is also caused to precipitate the very light coagulum, resulting in completely removing the tannic acid content generally present in tannery waste.

With my improvements the separating or removing of the impurities from the liquid waste, is appreciably expedited, rendered economical and the liquid obtained therefrom is of a pure quality.

The simple manner in which this treating mixture can be applied, constitutes an improvement over prior treatments, since the use of the acid mixed with the inert clay, and which, acting upon the calcium hydrate, brings about a stable effluent that will not be detrimental to any stream it enters. Moreover, no risk is taken if by carelessness or inadvertence too great a quantity of treating mixture is placed in the polluted liquid. As a precaution, a travertine filter, composed of 99% calcium carbonate is constructed at the outlet end of the treating tank so that all the treated liquid must pass therethrough before reaching the stream, thereby neutralizing any slight amount of acid that might be contained in the effluent.

My improved method may be carried out with the use of a tank structure such as shown in the accompanying drawings, in which Figure 1 is a perspective view and Figure 2 a longitudinal sectional view.

In the drawings, 1 represents the tank provided at an intermediate portion thereof with a baffle 2 which terminates above the bottom of the tank. An inlet pipe 3 is shown at one end of the tank and through this pipe, the previously mixed waste and treating mixture hereinbefore described, is discharged into the tank. Near the other end of the tank, a chamber 4 is provided and contains travertine 5 to form a travertine filter, and the liquid will flow over the wall 6 and then downwardly through the travertine, the liquid finding an exit through a valved outlet pipe 7.

Having fully described my invention what I claim as new and desire to secure by Letters Patent, is:—

1. A method for treating polluted liquids having an alkaline reaction and containing organic matter comprising adding to the polluted liquid substantially one part of a treating solution to each one hundred parts of the polluted liquid, the treating solution containing sulphuric acid, inert clay and water in substantially the following proportions, one part acid, nine parts inert clay and 100 parts water.

2. A method for treating polluted liquids having an alkaline reaction and containing organic matter comprising adding to the polluted liquid substantially one part of a treating solution to each one hundred parts of the polluted liquid, the treating solution containing sulphuric acid, inert clay and water in substantially the following proportions, one part acid, nine parts inert clay and 100 parts water, permitting precipitation of organic matter and subsequently passing the liquor through a travertine filter to insure a neutral final effluent.

In testimony whereof, I have signed this specification.

JOHN T. TRAVERS.